United States Patent
Pankl et al.

(10) Patent No.: US 6,588,106 B1
(45) Date of Patent: Jul. 8, 2003

(54) METHOD AND APPARATUS FOR INSTALLING ROLLER BEARINGS

(75) Inventors: Gerold Pankl, Bruck an der Mur (AT); Jochen Domschitz, Kitzeck (AT)

(73) Assignee: Pankl R&D GmbH, Bruck an der Mur (AT)

( * ) Notice: Subject to any disclaimer, the term of this patent is extended or adjusted under 35 U.S.C. 154(b) by 0 days.

(21) Appl. No.: 09/892,195

(22) Filed: Jun. 26, 2001

(30) Foreign Application Priority Data

Jun. 26, 2000 (EP) .............................. 00890197

(51) Int. Cl.$^7$ .............................. B21K 1/40; G01L 25/00
(52) U.S. Cl. .............................. 29/894.361; 29/898.07; 29/898.09; 29/407.02; 29/407.04; 29/724; 73/1.09; 73/1.12; 73/1.81; 73/866.5; 33/517
(58) Field of Search ............. 29/898.061, 898.062, 29/898.07, 898.09, 407.02, 407.04, 720, 724, 894.36, 894.361; 73/866.5, 1.09, 1.12, 1.81, 1.88, 862.49; 33/517

(56) References Cited

U.S. PATENT DOCUMENTS

| | | | | |
|---|---|---|---|---|
| 2,889,729 A | * | 6/1959 | Orner | |
| 4,054,999 A | * | 10/1977 | Harbottle | |
| 4,336,641 A | * | 6/1982 | Bhatia | |
| 5,497,559 A | * | 3/1996 | Okumura et al. | |
| 5,557,854 A | * | 9/1996 | Fujioka | |
| 5,597,965 A | * | 1/1997 | Endo et al. | |
| 5,685,068 A | * | 11/1997 | Bankestrom et al. | |
| 5,718,049 A | * | 2/1998 | Ohtsuki et al. | |
| 5,877,433 A | * | 3/1999 | Matsuzaki et al. | |
| 6,070,325 A | * | 6/2000 | Miyata et al. | |
| 6,234,022 B1 | * | 5/2001 | Tadokora | |
| 6,257,078 B1 | * | 7/2001 | Vencill | |
| 6,446,339 B2 | * | 9/2002 | Takamizawa et al. | |

* cited by examiner

Primary Examiner—Gregory Vidovich
Assistant Examiner—Eric Compton
(74) Attorney, Agent, or Firm—Kilpatrick Stockton LLP

(57) ABSTRACT

The invention concerns a method for the installation of pretensioned roller bearings (2), in particular angular ball bearings, for example, in wheel carriers of automobiles, airplanes, and the like.

The invention is characterized in that the installation apparatus, with a measurement probe (5), lies against a stop, a shoulder, or the like, in the axial area of the bearing race of one roller bearing, on the shaft side, and that upon tightening the shaft nut (3) against the bearing race of the other roller bearing, on the shaft side, its axial shift with respect to the stop is determined, wherein when the shaft nut is tightened, a torque wrench is used to determine the applied torque, which permits it to differentiate between the actual tensioning process of the roller bearing (2) and the previous process to bring the shaft nut (3) to the stop.

The invention also concerns an installation apparatus to implement the method.

8 Claims, 2 Drawing Sheets

METHOD AND APPARATUS FOR INSTALLING ROLLER BEARINGS

FIELD OF THE INVENTION

The invention concerns a method for the installation of roller bearings and an installation apparatus for roller bearings, in particular, angular ball bearings, for example, in wheel carriers of automobiles, airplanes, and the like.

BACKGROUND OF THE INVENTION

Such roller bearings must be installed with an initial stress specified by the bearing manufacturer, so as to have the correct seat and so as to attain the intended service life. With a large number of mass-produced automobiles, the two roller bearings are in the immediate vicinity and their bearing surfaces are worked in an axial direction in such a way that they have the necessary initial stress with a flush installation.

With high-performance motor vehicles, in particular, with racing cars, however, the two roller bearings, mostly angularly moving ball bearings, have a considerable distance between one another, since with such motor vehicles, the tires have a great width and there could be inadmissible moments of tilt with ball bearings which are immediately adjacent. This makes it necessary to ensure the required initial stress in a manner other than the one which is common with mass-produced automobile manufacturing. Up to now one has had recourse to the great experience of installers, who were able to determine, with a few tests of the turning capacity of the bearings, whether the bearings, in accordance with the magnitude, have the correct initial stress or not. By the increasing use of ceramic materials with ball bearings, for example, for roller bodies, in particular balls, it has now become very important that this initial stress be maintained within narrow limits, since the bearing is otherwise damaged.

Apparatuses to measure the initial stress of a roller bearing or roller bearings, which simplify such a measurement, and that can all be used under the conditions of mass production manufacturing but cannot be carried out under usage conditions such as those which prevail during a race, are known from U.S. Pat. No. 6,070,325 A, U.S. Pat. No. 4,336,641 A, U.S. Pat. No. 5,718,049 A, and U.S. Pat. No. 4,054, 999.

BRIEF SUMMARY OF THE INVENTION

The goal of the invention is to create an installation apparatus and an installation method, which makes it possible to easily inspect the initial stress of roller bearings during installation and thus to attain and maintain the correct initial stress prescribed by the manufacturer.

In accordance with the invention, this is done in that a length measurement gauge is placed against a stop at a known position in the axial area of one roller bearing in the interior of the hollow shaft; upon tightening the shaft nut against the bearing race of the other roller bearing, its axial shift with respect to the stop in the hollow shaft interior is determined, wherein when the shaft nut is tightened, a torque wrench is used, which permits the differentiation between the actual tension process of the roller bearing and the previous process to bring the shaft nut to a stop.

In this way, if the configuration and the material of the hollow shaft are known, which, in fact, is practically always the case, nowadays, through its construction, for example, via a finite element program, it is possible to determine the ratio between the longitudinal force and the elongation with sufficient accuracy, so as to arrive at the correct initial tension of the roller bearing with the measurement of the distance change of the length measurement gauge.

With only a torque wrench alone, it would not be possible to arrive at informative data because of the never reproducible ratios, on the one hand, between the shaft nut and thread and, on the other hand, between the shaft nut and the interior track of one bearing. However, the different torques upon turning the shaft nut to the roller bearing ring and the subsequent bringing about of the initial tension are sufficient, so as to take into consideration here only the length changes which go back to the initial tension process.

BRIEF DESCRIPTION OF DRAWING FIGURES

The invention is explained in more detail below, with the aid of the drawings.

DETAILED DESCRIPTION OF PREFERRED EMBODIMENT

Figure 1:
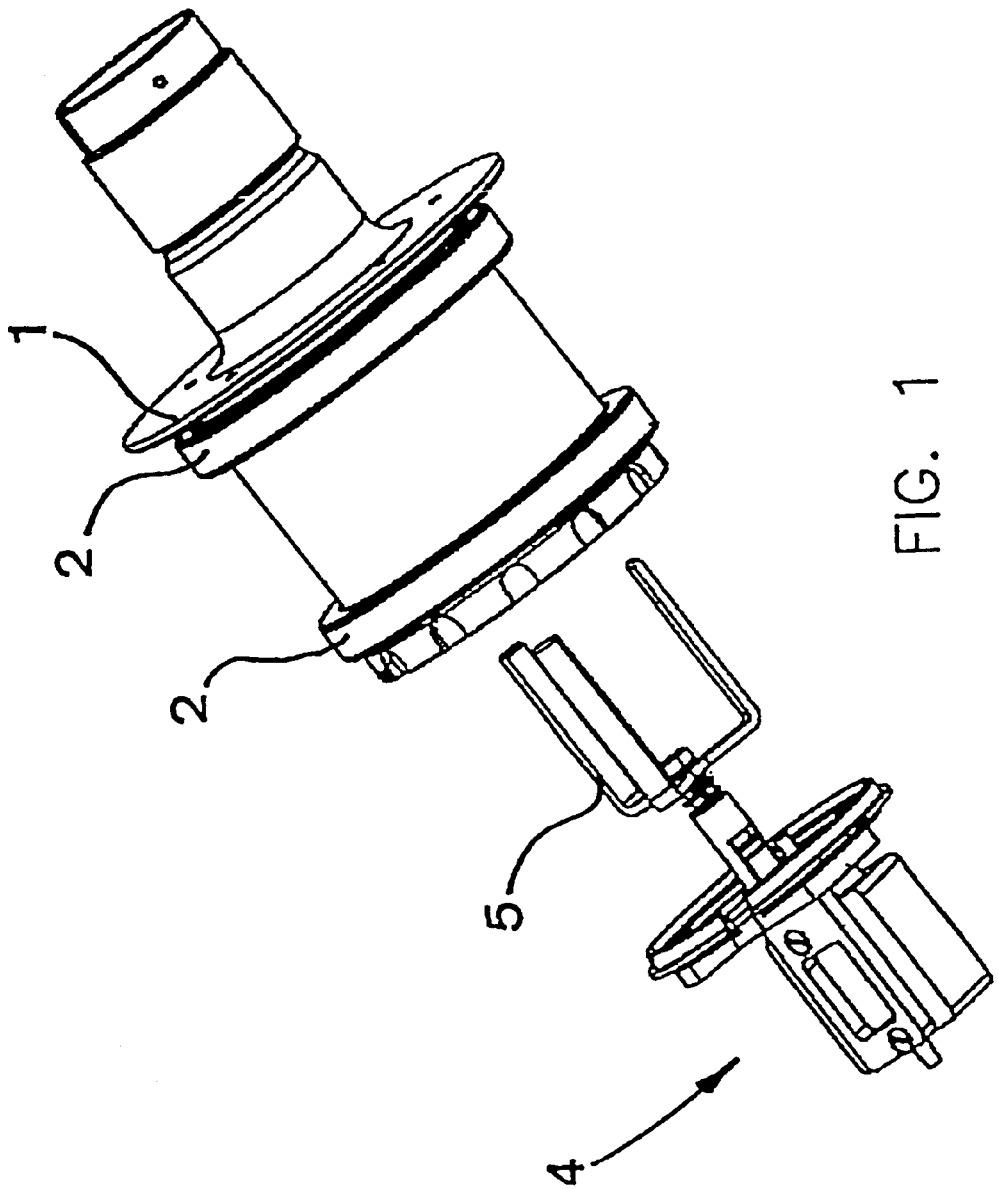
FIG. 1 shows a view of an installation apparatus, in accordance with the invention, before its introduction into a hollow shaft.

FIG. 1 shows an inclined view of a hollow shaft 1, with two roller bearings 2 and an installation apparatus 4, in accordance with the invention, before its introduction into the hollow shaft 2 to carry out the installation or to bring about the initial tension of the roller bearing 2.

Figure 2:
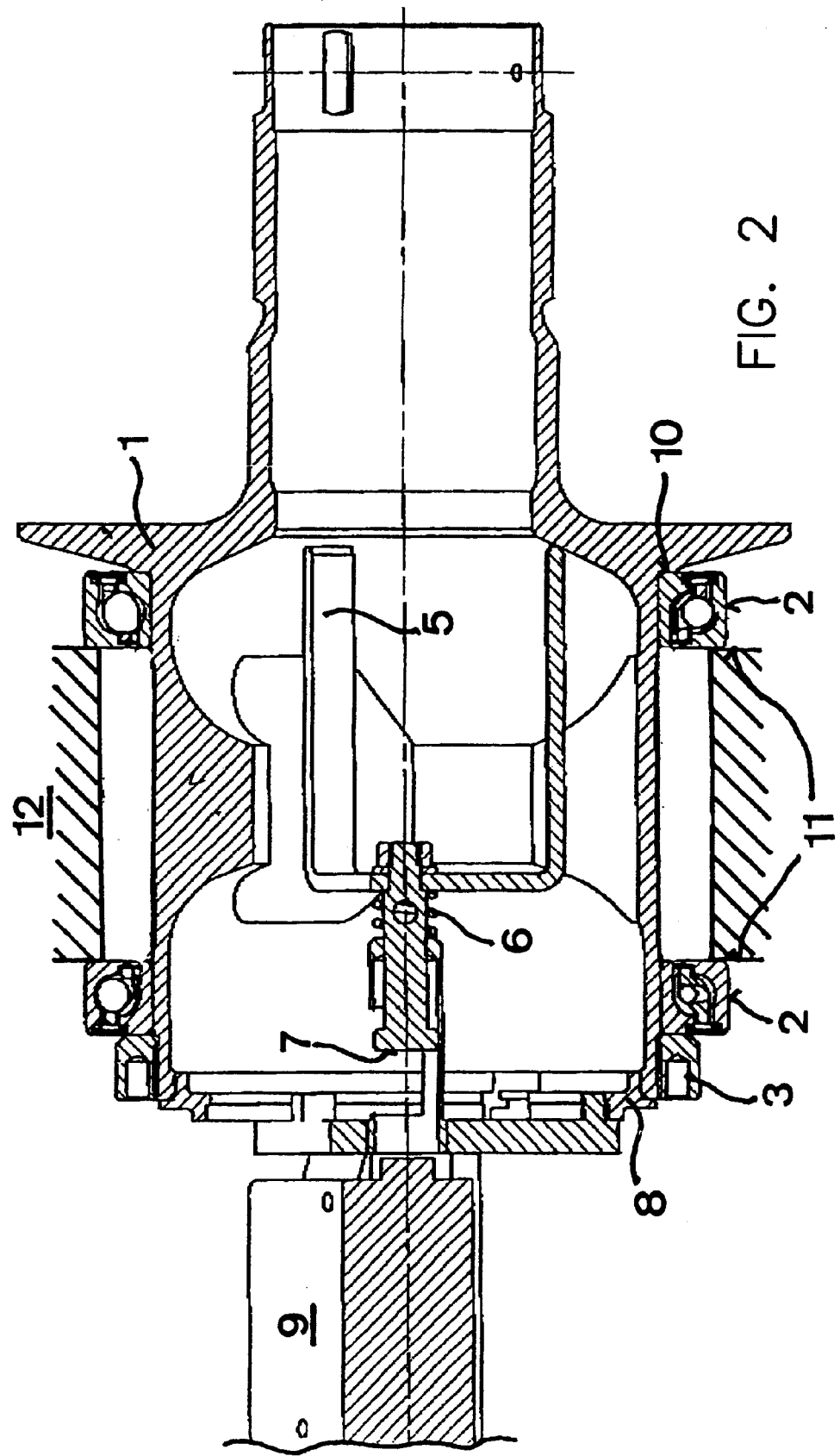
FIG. 2 shows a section through such an installation apparatus after it was introduced into the hollow shaft.

As can be seen better from FIG. 2, one roller bearing lies, with its interior ring, against a shoulder 10 of the hollow shaft 1, whereas the other, with its interior ring, lies against the shaft nut 3, through whose tightening the two inner rings of the roller bearing 2 can be pressed toward one another.

Shoulders 11 of the wheel carrier 12, which is not shown for reasons of clarity, lie between the two outer rings of the roller bearing 2; of course, in the installation, it is already brought up since the initial tension of the two roller bearings 2, required by the bearing manufacturer, must, in fact, be produced against these shoulders 11.

The apparatus, in accordance with the invention and designated in its entirety by 4, essentially consists of a feeler 5, which can be shifted longitudinally and is connected with an actual measurement gauge 9. The measurement gauge 9 is firmly connected axially (or can be fixed) with a stop 8, which lies on the outer area of the hollow shaft 1. The installation apparatus 4 has such a slim design in the radial direction that the shaft nut 3, which secures the roller bearing 2 and imparts to it the needed initial tension, can be shifted via the installation apparatus 4 and such that the special wrench, with which the shaft nut is tightened, also fits via the installation apparatus 4.

During the installation, the supporting part or feeler 5 is supported against an inner stop of the hollow shaft, which lies in the area of the right roller bearing 2, whereas the stop 8 is supported in the area in which the left roller bearing 2 is situated. A spring 6 ensures that the stop 5, which can be shifted axially with respect to the measurement gauge 9 and the stop 8, is, if possible, moved away by it.

Firmly connected with a stop 5 is a measurement surface 7, which is preferably designed to be mirror-like, and whose distance to the stop 8 can be determined by means of a laser distance measurement gauge or also by means of a sensitive measurement probe.

The installation takes place in the following manner: the roller bearings 2 are shifted up with the corresponding wheel carrier or wheel carrier part 12 onto the hollow shaft 1; the shaft nut 3 is put on and the installation apparatus 4 is pressed on the hollow shaft 1, which can be done via an external fixing, a thread, or the like. The shaft nut 3 is then tightened with a torque wrench, in which it is possible to read the torque with which the tightening is carried out. At the same time, a reading can be done on the measurement gauge 9 or a monitor connected with it to see how the distance between the stops 5 and 8 changes.

If the shaft nut 3 lies firmly against the inner ring of the left roller bearing 2, the torque needed to further turn the torque wrench, which must then be produced so as to create the initial tension, is clearly greater than before; at the same time, the distance between the stops 5 and 8 is first increased. The correlation between these two changes permits an examination of the satisfactory seat of the bearings and the shaft nut, as well as the beginning of the tensioning activity.

Subsequently, the shaft nut 3 is tightened with an increasingly greater torque, and a greater and greater distance between the measurement points of the stops 5 and 8 is determined on the measurement gauge 9. If this length change corresponds to the value which was assigned to this hollow shaft for a prespecified initial tension, then the correct initial tension is attained on the roller bearing and the shaft nut can be secured in the position thus attained. The installation apparatus 4 is drawn in an axial direction from the hollow shaft, and the hollow shaft is ready for the final installation.

The correlation between the length change and the thereby attained initial tension is obtained with a knowledge of the construction details of the hollow shaft 1, in particular, its configuration (material accumulations) and the selected material. It is essential only that the individual stops 5 and 8 for the measurement probes lie, on the one hand, in the area of one roller bearing and, on the other hand, in the area of the other roller bearing. Since an exact axial agreement is not attainable with a justifiable expenditure because the construction circumstances do not permit this, it is necessary—knowing the construction of the hollow shaft, which is also easily possible—to find the corresponding elongation values for the used stops in the hollow shaft, as they are shown, for example, in FIG. 2.

Stop 5 is at the end of the carrying section of the hollow shaft and stop 8 is at the outer end of the hollow shaft, and thus somewhat outside the seat of the bearings.

Thus, for each hollow shaft, a list of value pairs can be made, which correlates the elongation to be measured during the installation with the initial tension which was previously calculated from the construction documents and perhaps also experimentally examined. In this way, the required exact attainment of the initial tensions for roller bearings, in particular for roller bearings with ceramic components, and here again especially for angularly moving ball bearings, is easily and rapidly possible, which is extremely important with extensions and reconstructions in case of mishaps in open terrain.

The invention is not limited to the described example of two roller bearings of a wheel carrier but rather can be used with machine tools exactly as with, very generally, shaft bearing arrangements in machine construction. To implement the invention, only the existence of the possibility to stop the measurement probe in the area of one of the two bearings is necessary.

What is claimed is:

1. Method for the installation of a pretensioned roller bearing assembly in a wheel carrier, the assembly comprising a hollow shaft having a shoulder, first and second roller bearings, and a shaft nut, wherein the method comprises:

placing the first roller bearing against the shoulder of the hollow shaft;

installing the hollow shaft having the first roller bearing into the wheel carrier, such that the fist roller bearing opposite the shoulder of the hollow shaft abuts a first surface of the wheel carrier;

placing the second roller bearing onto the hollow shaft, such that the second roller bearing abuts a second surface of the wheel carrier;

placing the shaft nut onto the hollow shaft, such that the shaft nut abuts the second roller bearing;

placing an installation apparatus having, a measurement probe and a stop member, so that the measurement probe lies against an internal stop of the hollow shaft, and the stop member abuts an outer end of the hollow shaft;

tightening the shaft nut against the second roller bearing;

determining the axial shift of the measurement probe with respect to the stop member; and using a torque wrench to determine the applied torque when the shaft nut is tightened while measuring the change of distance between the stop member and a predetermined reference stop, which permits a differentiation between the actual tensioning process of the roller bearing and the previous process to tighten the shaft nut.

2. Method according to claim 1, characterized in that the change in the distance is determined by means of a laser distance measurement gauge.

3. Method according to claim 1, characterized by the measurement probe (5) being mounted so that it the measurement probe can move axially with respect to the member (8) to determine the distance between the measurement probe (5) and stop member (8).

4. Method according to claim 1, characterized in that a measurement surface (7) is firmly connected with the measurement probe (5) and serves as a reference surface for the distance measurement.

5. Method according to claim 1, wherein a measurement gauge is provided for evaluating the axial shift measurement.

6. Apparatus for the installation of a pretensined roller bearing assembly in a wheel carrier having a shaft nut, the apparatus comprising:

a measurement probe;

a stop member being mounted so that the stop member can move axially with respect to the measurement probe; and a measurement gauge connected to the stop member to determine the distance between the measurement probe and the stop member so as to evaluate the axial shift between the measurement probe and the stop member, wherein the measurement probe is adapted to lay against an internal stop of a hollow shaft of said wheel carrier and the stop member is adapted to abut an outer end of said hollow shaft, whereby the amount of axial shift between the internal stop of the hollow shaft and the outer end of the hollow shaft is determined by the measurement gauge in response to application of a predetermined amount of torque to the shaft nut of the wheel carrier.

7. Apparatus of claim 6, wherein the measurement gauge is a laser distance measurement gauge.

8. Apparatus of claim 6, wherein a measurement surface (7) is firmly connected with the measurement probe (5) and serves as a reference surface for a distance measurement.

* * * * *